United States Patent
Schwarz

(10) Patent No.: US 8,384,339 B2
(45) Date of Patent: Feb. 26, 2013

(54) CONTROL SYSTEM FOR A COMPRESSOR ACTUATED BY AN ELECTRIC MOTOR, AN ASSEMBLY COMPOSED OF AN ELECTRIC INDUCTION MOTOR, AN ELECTRONIC CONTROL AND AN ARRANGEMENT FOR MOTOR-COMPRESSORS, AND A METHOD OF CONTROLLING AN ELECTRIC MOTOR

(75) Inventor: Marcos Guilherme Schwarz, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 439 days.

(21) Appl. No.: 12/532,357

(22) PCT Filed: Jan. 9, 2008

(86) PCT No.: PCT/BR2008/000006
§ 371 (c)(1),
(2), (4) Date: Jan. 28, 2010

(87) PCT Pub. No.: WO2008/113140
PCT Pub. Date: Sep. 25, 2008

(65) Prior Publication Data
US 2011/0050156 A1 Mar. 3, 2011

(30) Foreign Application Priority Data
Mar. 20, 2007 (BR) .................................... 0700844

(51) Int. Cl.
*H02P 27/02* (2006.01)
(52) U.S. Cl. ........................ 318/812; 318/504
(58) Field of Classification Search ................. 318/479, 318/504, 808, 812
See application file for complete search history.

(56) References Cited

U.S. PATENT DOCUMENTS

| | | | | |
|---|---|---|---|---|
| 5,396,579 A | * | 3/1995 | Koji et al. | 706/5 |
| 5,412,303 A | * | 5/1995 | Wernicki | 318/729 |
| 5,572,112 A | * | 11/1996 | Saeki et al. | 323/282 |

(Continued)

FOREIGN PATENT DOCUMENTS

| | | |
|---|---|---|
| EP | 1 067 671 | 1/2001 |
| WO | WO 03/044939 | 5/2003 |
| WO | WO 2005/053147 | 6/2005 |

OTHER PUBLICATIONS

International Search Report for corresponding international application No. PCT/BR2008/000006, mailed May 6, 2008.

(Continued)

*Primary Examiner* — Bentsu Ro
(74) *Attorney, Agent, or Firm* — Alston & Bird LLP

(57) ABSTRACT

The present invention relates to a control system, a method and arrangement for motors and motor-compressors, designed for operation in a wide voltage range of the feed network. The control system, method and arrangement for motors and motor-compressors basically consist in associating an electronic control (10) capable of regulating the voltage supplied to a motor with windings and a magnetic core suitably dimensioned so as to fully meet the start and operation torques in the minimum voltage expected for the electric energy network, the electronic control (10) incorporating the method of limiting the effective value on the motor windings so as to keep its capability of meeting the minimum torques specified for the application, independently of the rise in the network voltage to values higher than the minimum voltage expected for the network.

13 Claims, 1 Drawing Sheet

U.S. PATENT DOCUMENTS

| | | | | |
|---|---|---|---|---|
| 5,670,859 A * | 9/1997 | North et al. | ............. | 318/801 |
| 5,949,158 A * | 9/1999 | Schulz | ............. | 307/127 |
| 6,331,670 B2 * | 12/2001 | Takehara et al. | ............. | 136/244 |
| 6,867,633 B2 * | 3/2005 | Godat | ............. | 327/306 |
| 6,997,408 B2 * | 2/2006 | Watano et al. | ............. | 241/30 |
| 7,679,343 B2 * | 3/2010 | Kokubun et al. | ............. | 323/268 |
| 2002/0014873 A1 * | 2/2002 | Yoshimura | ............. | 318/471 |

OTHER PUBLICATIONS

International Preliminary Report on Patentability of corresponding application No. PCT/BR2008/000006 mailed May 7, 2009.
Applicants Reply to Written Opinion dated Mar. 4, 2009.
Amendments Under PCT Article 34.

* cited by examiner

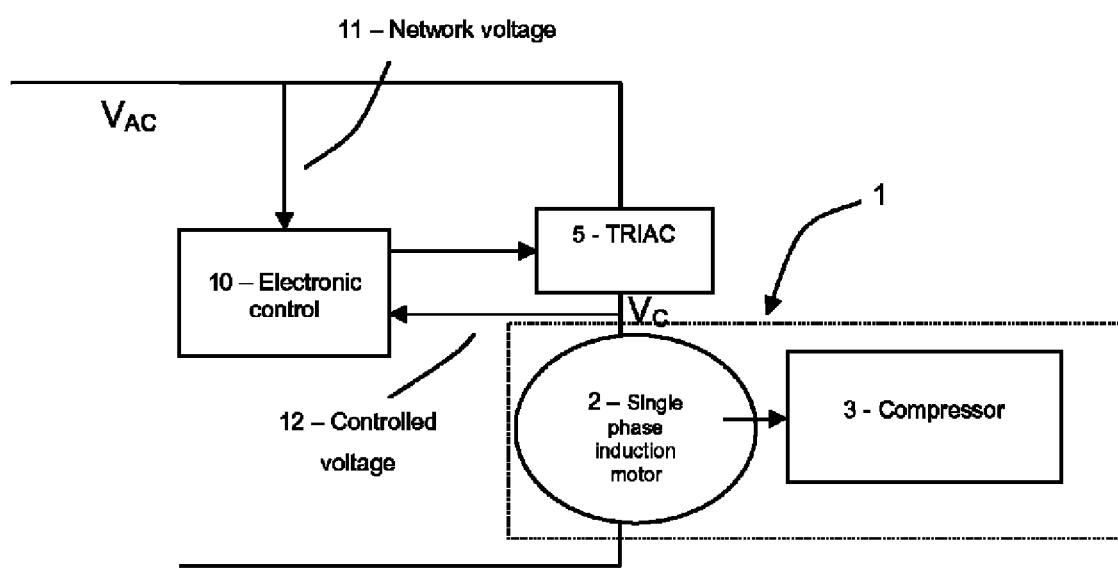

CONTROL SYSTEM FOR A COMPRESSOR ACTUATED BY AN ELECTRIC MOTOR, AN ASSEMBLY COMPOSED OF AN ELECTRIC INDUCTION MOTOR, AN ELECTRONIC CONTROL AND AN ARRANGEMENT FOR MOTOR-COMPRESSORS, AND A METHOD OF CONTROLLING AN ELECTRIC MOTOR

The present invention relates to a control system, a method and an arrangement for motors and motor-compressors, designed for operation in a wide voltage range of the feed network.

DESCRIPTION OF THE PRIOR ART

Single-phase induction motors are widely used on motor-compressors, pumps, ventilators, household tools and appliances, and their performance thereof being sensitive to variation in the network voltage. The capability of overcoming the load at the start, the efficiency, the heating and the maximum power supplied depend on the dimensioning thereof and on the voltage range to which they are subjected, this voltage being imposed by the network.

The dimensioning of these motors basically consists in defining the amount of electrical steel and the electric-conductor mass (copper mass), wherein the larger the amount of material employed the better the performance of the motor and the higher the maximum power that can be extracted from it continuously. The nominal operation voltage of the motor is defined by the characteristics of the windings, and it is necessary to define the minimum voltage which the motor runs in order to keep the capability of overcoming the specific load torque. For a given winding, as the voltage applied to the electric motor increases, the power that can be extracted will increase. On the other hand, the maximum voltage that can be applied to the motor is defined by the maximum temperature which the materials employed withstand, determining the condition of maximum voltage of use.

As it becomes necessary to dimension the electric motor to operate at a maximum voltage that is quite higher than the minimum voltage, that is to say, the greater the relation between the maximum and the minimum voltage the larger the additional amount of material required for making this motor project feasible, which makes it more expensive.

Thus, motors employed under conditions in which the network voltage varies within a broader range are more expensive than motors used under conditions in which the network has little variation.

In general, in less developed countries, due to ecological limitations, feed networks have serious limitations in their dimensioning, with the consequent loss in quality of the energy, having a poor voltage regulation, much floating, with periods of very high voltage when there so little demand, and quite low voltages when many loads are connected.

As an example, a feed network with a nominal voltage of 230 V and high quality of energy, typically varies its voltage in a range of −10 to +15%, whereas in a network of low quality of energy, the variation may be in the range of −30 to +35%.

Thus, on markets where there are economical restrictions, there is usually an unfavorably conjunction of factors, on the one side the low quality of electric energy and on the other the demand for more economical products, which makes difficult or unfeasible the design of motors suitable for these applications.

The prior art in this filed is described in Patent Document WO 2005053147, where one designs an electric motor in order to work with a nominal voltage of operation or value of root mean square voltage, also called as effective value that is lower than the minimum value expected in the feed network voltage. The aim of this configuration allows the possibility of always feed the motor, and for this purpose suffice it that the value of the controlled voltage should be lower than the value of the minimum network voltage. However, this configuration does not enable one to build the electric motor with dimensions smaller than the conventional ones, nor does it foresee correction of the level of voltage to be applied in order to compensate losses resulting from harmonics.

BRIEF DESCRIPTION AND OBJECTIVES OF THE INVENTION

The present invention foresees a control system, an electronic control assembly with an electric motor, a method and arrangement for motors and motor-compressors for enabling operation in a wide voltage range, making use of little material, specifically steel and copper, such a configuration enabling the use, for instance, of small-size compressors, making possible a number of cooling solutions, wherein the size is of particular relevance. As an example, the utilization of a compressor carcass of smaller size or lower height, which enables greater utilization of the space in the cooler, greater ease in assembling it, besides requiring a smaller amount of material and, therefore, being more economical.

Thus, according to the teachings of the present invention, the control system, assembly, method and arrangement for motors and motor-compressors designed for operation in a wide range of voltage of the feed network is constituted by an electronic control that receives the voltage supplied by the feed network and feeds the windings of the electric motor or motor-compressor for cooling, limiting the voltage to an effective value close to the value of the expected minimum voltage for the feed network, so as to enable the motor to have the capability of overcoming start and load operation torques, independently of the feed network having a rise in the voltage to its maximum expected value. When the feed network voltage exhibits a value higher than the minimum expected, the electronic control will limit the voltage supplied to the motor to a value close to the minimum expected in this feed network.

Among the objectives of the present invention, one is to provide systems employing single-phase induction motors capable of operating in a wide voltage range, while keeping full torque performance when the electric feed network exhibits voltage at its minimum level.

Another objective of this invention is to provide systems employing single-phase induction motors capable of operating in a wide voltage range, preventing the overheating of the materials when the electric feed network exhibits voltage at its maximum level.

A further objective of the present invention is to provide systems employing single-phase induction motors capable of operating in a wide voltage range, while keeping the efficiency performance substantially high, even when the feed voltage is at its highest level.

Still another objective of the present invention is to provide systems employing single-phase induction motors capable of operating in a wide voltage range with a reduced cost.

The control system, method and arrangement for motors and motor-compressors basically consists in associating an electronic control capable of regulating the voltage supplied to a motor with windings and magnetic core suitably dimensioned to fully meet the start and operation torques at the minimum expected voltage for the electric energy network, wherein the electronic control incorporates the method of limiting the effective voltage on the motor windings, so as to maintain its capability of meeting the minimum torques specified for the application, independently of the rise in feed network voltage to values higher than the minimum voltage expected for the network.

These objectives are achieved by means of a control system for controlling a compressor actuated by an electric motor, the system comprising an electronic control and at least one power switch electrically connected to the feed network voltage, the feed network voltage floating from a minimum network voltage, the power switch interconnecting the network voltage to windings of the electric motor and means in order to measure the voltage of the feed network voltage and a controlled voltage applied to the windings of the electric motor, the electronic control being configured to periodically actuate the power switch, so that the constantly controlled voltage will be essentially close to the minimum network voltage expected for the network voltage.

The objectives are further achieved by means of an assembly of electric induction motor and electronic control, the assembly being electrically connected to a feed network voltage that floats from a minimum network voltage, the electric motor being dimensioned to operate essentially in a voltage range close to the minimum network voltage expected for the network voltage.

Another way of achieving the objectives of the present invention is through an arrangement for motor-compressors, formed by a compression mechanism, coupled to an electric induction motor, the electric induction motor being fed by a controlled voltage, the controlled voltage being regulated by an electronic control, from a feed network voltage, the network voltage floating from a minimum network voltage, the arrangement being dimensioned to operate essentially in a voltage range close to a minimum network voltage expected for the feed network.

A further way of achieving the objectives of the present invention consists of a control method for controlling an electric motor, the electric motor being fed by a controlled voltage obtained from a network voltage, the network voltage floating from a minimum network voltage, the method comprising steps of continuously measuring the value of the network voltage, and decreasing the value of the controlled voltage to a level essentially close to the minimum network voltage expected and keeping it at this level.

BRIEF DESCRIPTION OF THE DRAWING

The present invention will now be described in greater detail with reference to an embodiment represented in the drawing.

FIG. 1 shows a block diagram of the control system and arrangement for motors and motor-compressors, designed for operation in a wide range of voltage from the feed network, according to the teachings of the present invention.

DETAILED DESCRIPTION OF THE FIGURE

As can be seen from FIG. 1, the control system for controlling a compressor actuated by an electric motor of the present invention comprises an electronic control 10, which is constituted by a processing unit electrically associated with at least one power switch 5, the power switch 5 being electrically connected to a network voltage $V_{AC}$. The power switch 5 interconnects the feed network voltage $V_{AC}$ to windings (not shown) of the electric motor 2, the electronic control 10 being configured to periodically actuate the power switch 5, so that one can control the level of the network voltage $V_{AC}$ to a level of a controlled voltage $V_C$.

Measurement means for measuring network voltage 11 and for measuring controlled-voltage 12 are also foreseen for measuring the network voltage $V_{AC}$ and the controlled voltage $V_C$, respectively.

Operationally, the electronic control 10 receives the information of the voltage value present in the feed network (network voltage $V_{AC}$) and of the voltage applied onto the windings of the motor (controlled voltage $V_C$), and on the basis of this information it periodically activates electronic switches so as to apply a constant effective voltage to the motor windings, in other words, so that the controlled voltage $V_C$ will always be essentially close to the minimum network voltage $V_{AC-MIN}$ expected for the network voltage $V_{AC}$.

The electronic switches or power switches 5 used may be of the TRIAC type or others that enable the conduction and interruption of the alternating current applied to the windings of the electric motor 2. If the switch is of the TRIAC type, the periodic actuation of the switch will take place at a moment delayed with respect to the crossing of the current through the value zero, at each cycle of the network voltage, and the longer this delay the greater the relation between the feed network effective value and the value applied to the motor winding.

Adjustment of the Level of the Controlled Voltage $V_C$ to Variations in the Network Voltage $V_{AC}$ When a TRIAC is used, there is a cut in the $V_{AC}$ wave form, which is originally sinusoidal and ceases to be sinusoidal, with cuts that, as they are increased, begin to generate a number of harmonics, which will gradually increase as the cut of the wave becomes larger, that is to say, as the value of the network voltage $V_{AC}$ becomes higher and farther away from the value of the minimum network voltage $V_{AC-MIN}$, a situation in which one should further cut the sinusoidal wave, so that the value of the controlled voltage $V_C$ will reach the value of the minimum network voltage $V_{AC-MIN}$.

With the cuts that occurred in the network voltage $V_{AC}$ to reach a level of controlled voltage $V_C$ to levels close to the level of minimum network voltage $V_{AC-MIN}$, as the harmonics rise the current harmonics within the windings of the electric motor 2 will also increase and generate, within the electric motor, various torque curves that will cause some braking of on the rotor, generating heating and specially losses in the motor torque, and such loss of torque should be compensated for depending on the losses caused by the harmonics.

In order to compensate for this, according to the teachings of the present invention, one should then raise the level of the controlled voltage $V_C$ to a value higher than the value of the minimum network voltage $V_{AC-MIN}$ proportionally to the value of the feed network voltage $V_{AC}$, so as to compensate for effects of loss of torque of the electric motor 2 through the harmonic contents of the voltage. This increment in the voltage to compensate for secondary effects caused by the harmonic contents of the voltage applied to the motor can be determined theoretically from the electric models of the motor and of computer simulation routines, as well as determined empirically from bench assays, by checking the performance of the electric motor 2. Since these are secondary effects, this compensation is generally dispensable.

As a general rule, one can consider that the difference between the value of the minimum network voltage $V_{AC-MIN}$ and the controlled voltage $V_{AC}$ will be proportional to the difference between the network voltage $V_{AC}$ and the minimum network voltage $V_{AC-MIN}$ expected, since the necessary compensation has a substantially linear behavior depending on the level of cut of the network voltage $V_{AC}$ by the TRIAC and the consequent increase in the amount of harmonic components.

In terms of practical implementation according to the teachings of the present invention, one should configure the electronic control 10 so that the controlled voltage $V_C$ will be essentially close to the value of the minimum network voltage $V_{AC-MIN}$, and the closer to this value the network voltage $V_{AC}$ measured by the network-voltage measuring means 11 is, the closer to the minimum network voltage $V_{AC-MIN}$ the level of the controlled voltage $V_C$ should be kept. From the opposite point of view, one should configure the electronic control 10 so that the controlled voltage $V_C$ will be essentially close to the value of the minimum network voltage $V_{AC-MIN}$, and the farther away the network voltage $V_{AC}$ measured by the network-voltage measuring means 11 is from this value, the farther away from and above the value of the minimum network voltage $V_{AC-MIN}$ the level of the controlled voltage $V_C$ should be.

A further way of actuating according to the teachings of the present invention, one can establish that the difference between the value of the minimum network voltage $V_{AC-MIN}$ and the controlled voltage $V_C$ should be proportional to a level of cut effected by the power switch 5 in the network voltage $V_{AC}$ to reach the level essentially close to the minimum network voltage $V_{AC-MIN}$ expected.

In this way, the necessary compensation in the level of the controlled voltage $V_C$ will take place, so that one can eliminate the effects resulting from the appearance of harmonic components, as described before.

Compensation for Heating Effects

As it is known, as the cuts at the level of the network voltage $V_{AC}$ rise, this will raise the harmonic contents of the signal, generating a heating of the electric motor 2. However, such an effect is significantly smaller in comparison with the level of heating when one applies the value of the full sinusoidal of the network voltage $V_{AC}$ to the motor 2, that is to say, without cuts made by the TRIAC, since in this situation of full sinusoidal wave, saturation of the iron would occur, generating losses in copper.

The present invention will solve this problem, inasmuch as no loss is generated in the motor, i.e., no heating is generated any longer. The heating resulting from the harmonic components as a function of the decrease of the network voltage $V_{AC}$ for the level of controlled voltage $V_C$ is significantly smaller if compared with the level of heating that would occur if the full sinusoidal of the network voltage $V_{AC}$ is applied, so that, for practical purposes, one could consider that in the system of the present invention no heating occurs, whereas in the art of applying the full level of the network voltage $V_{AC}$, heating occurs.

Construction in Assemblies of Electric Motor and Electronic Control and Arrangements for Motor-Compressors Bearing in mind that the concepts of the present invention are particularly applicable in cooling systems, one foresees the construction in the form of assembly of the electric induction motor 2 and of the electronic control 10, as well as an arrangement for motor-compressors, formed by a compression mechanism, coupled to the electric induction motor 2, making the same control effected according to the constructiveness applied to the system of the present invention, that is to say, the electric motor 2 is dimensioned to operate substantially in the voltage range close to the minimum network voltage $V_{AC-MIN}$ expected for the network voltage $V_{AC}$, that is, within the same concepts applied to the system of the present invention.

Thus, the arrangement of the motor to operate in conjunction with this electronic control and method consists in dimensioning the windings of the motor so as to provide a torque value sufficient to overcome the highest load required by the application, in a voltage equal to the minimum expected voltage for the feed network in question. In this way, the motor will be capable of operating without problems even when the feed network voltage is at its minimum value, and in this condition the electronic control will not be limited to the voltage coming from the network, which allows it to be fully applied to the motor.

Further, in applications where the electric motor 2 is actuating a motor-compressor 1 for cooling, the sizing of this compressor 3 will enable the gas compression mechanism and the electric motor 2 to be installed on a smaller carcass, since the electric motor will have a significantly reduced size with respect to the motor sized for a compressor designed according to the prior art. This motor-and-pump assembly according to the proposed technique in the present invention will not present additional heating in the periods in which the application network is exhibiting voltage higher than the minimum voltage expected for the network, facilitating the maintenance of the temperature ranges of the electric and mechanical assembly of the compressor, in values that are acceptable for the efficiency performance of the compressor 1 and durability of the materials, which will make it possible to provide a quite compact light-weight motor-compressor to operate in severe conditions with a wide variation of the electric network voltage, employing conventional materials and with reduced cost.

Sizing of the Electric Motor 10

As to the sizing of the motor, since the electric motor 5 operates at a decreased level of voltage and since it is designed to operate at the level of the minimum network voltage $V_{AC-MIN}$ foreseen in the network, the motor should be suitably dimensioned, that is, with reduced dimensions.

In this way, taking as an example a feed network that exhibits minimum network voltage $V_{AC-MIN}$ decreased by 30% below the usually foreseen nominal one, the winding of the electric motor 2 will have its number of turns reduced to operate with 30% of undervoltage, which consists in a design different from that intended for a feed network exhibiting only 10% of reduction of the voltage with respect to the nominal value. In conjunction with this reduction in the number of turns, one also dimensions the magnetic core so as to operate, under the condition of the minimum value of feed network voltage $V_{AC-MIN}$, with the highest possible level of induction, respecting the minimum efficiency required for application, which will lead to a significant reduction in the volume of magnetic material employed, since this sizing can be made only by considering this minimum value of network voltage, not by considering the maximum value expected for the feed network any longer, which could be up to 35% higher than the nominal value.

Further taking as a basis the above example, in the feed networks where one operates with a range of −30% below the minimum feed network voltage $V_{AC-MIN}$ of the network voltage $V_{AC}$ and +35 above the network voltage $V_{AC}$, this results in about 20% reduction in copper and about 33% reduction in steel, which are necessary to construct the electric motor 2. Further taking as a basis the variation of −30% to +35% in the network voltage $V_{AC}$, it is possible to obtain a decrease in the range of about 20-25% decrease in the motor height.

Option for Operation in Bi-Volt

Bearing in mind the characteristics of the present invention, it is possible to make the electric motor 2 a bi-volt one.

For this purpose, if the controlled voltage $V_C$ is modulated for the double of the minimum voltage $V_{AC\text{-}MIN}$, for example, it would be possible to construct a system capable of adjusting automatically and operate connected either to a 220V network or to a 127V network. Although the motor operates with less efficiency at high voltage, it would still be possible to operate it, for example, without heating and overload problems.

On the basis of the teachings of the present invention, one can achieve the desired objectives, and it is possible to manufacture a compressor with a significantly decreased volume and, at the same time, to have a product that operates in a wide range of network voltage values $V_{AC}$, including the configuration of a bi-volt product.

Preferred embodiments having been described, it should be understood that the scope of the present invention covers other possible variations, being limited only by the contents of the accompanying claims, which include the possible equivalents.

The invention claimed is:

1. An arrangement for motor-compressors, formed by a compression mechanism, coupled to an electric induction motor, the electric induction motor being fed by a controlled voltage, the controlled voltage being regulated by an electronic control, from a feed network voltage, the feed network voltage floating from a minimum network voltage,
   wherein the motor-compressor is sized to operate essentially in a voltage range close to a minimum network voltage expected for the feed network.

2. An arrangement for motor-compressors according to claim 1, wherein the electronic control limits the controlled voltage applied to the electric motor to a level essentially close to the minimum network voltage expected.

3. An assembly of an electric induction motor and an electronic control electrically connected to a feed network voltage, the feed network voltage floating from a minimum network voltage,
   wherein the electric motor is dimensioned to operate essentially in a voltage range close to the minimum network voltage expected for the network voltage, the assembly being further configured such that the electronic control keeps the controlled voltage essentially close to the value of the minimum network voltage, and the farther away the network voltage measured by the network-voltage measuring means is from the value of the minimum network voltage, the farther away from and above the value of the minimum network voltage the level of the controlled voltage should be.

4. An assembly according to claim 3, wherein the electronic control applies a controlled voltage to the electric motor, the controlled voltage being limited to a value essentially close to the minimum network voltage.

5. A method for controlling an electric motor applied to a compressor, the electric motor being fed by a controlled voltage obtained from the feed network voltage, the feed network voltage floating from a minimum network voltage, the method comprising the steps of:
   continuously measuring the value of the feed network voltage by means of a network-voltage measuring means and an electronic control;
   continuously measuring the value of the controlled voltage by means of a measuring controlled-voltage and the electronic control; and
   reducing the value of the controlled voltage, proportional to a level of cut effected by a power switch in the network voltage, to a level essentially close to the minimum network voltage expected and keeping it at this level.

6. A method as defined in claim 5, wherein, in the step of keeping the level of the controlled voltage close to the level of the minimum network voltage, the closer to this value the measured feed network voltage is, the closer to the value of the minimum network voltage the level of the controlled voltage will be kept.

7. A method according to claim 6, wherein, in the step of keeping the level of the controlled voltage close to the level of the minimum network voltage, the difference between the value of the minimum network voltage and the controlled voltage should be proportional to the difference between the feed network voltage measured and the minimum network voltage expected.

8. A control system for a compressor actuated by an electric motor, the system comprising:
   an electronic control;
   at least one power switch electrically connected to the feed network voltage, the feed network voltage floating from a minimum network voltage; and
   a power switch interconnecting the feed network voltage to windings of the electric motor;
   wherein the electronic control is configured to periodically actuate the power switch, so that the controlled voltage will be kept essentially close to the minimum network voltage expected for the feed network voltage, the assembly formed by the compressor and the electric motor is dimensioned to operate essentially close to the minimum network voltage, the control system further comprising network voltage measurement means and controlled voltage measurement means to measure the feed network voltage and the controlled voltage, respectively.

9. A system according to claim 8, wherein the electric motor is dimensioned to operate essentially in a voltage range close to the minimum network voltage expected for the network voltage.

10. A system according to claim 9, wherein the electronic control keeps the controlled voltage essentially close to the value of the minimum network voltage, and the closer to this value the network voltage measured by the voltage measurement means is, the closer to the value of the minimum network voltage the level of the controlled voltage will be.

11. A system according to claim 9, wherein the electronic control keeps the controlled voltage essentially close to the value of the minimum network voltage, and the controlled voltage being kept farther away from the value of the network voltage in a proportional manner to the difference between the minimum network voltage and the network voltage measured by the voltage measurement means.

12. A system according to claim 9, wherein the difference between the value of the minimum network voltage and the controlled voltage is proportional to the difference between the network voltage measured and the minimum network voltage expected.

13. A system according to claim 9, wherein the difference between the value of the minimum network voltage and the controlled voltage is proportional to a level of cut effected by the power switch in the network voltage, to reach the level essentially close to the minimum network voltage expected.

* * * * *

UNITED STATES PATENT AND TRADEMARK OFFICE
CERTIFICATE OF CORRECTION

PATENT NO.        : 8,384,339 B2  
APPLICATION NO. : 12/532357  
DATED             : February 26, 2013  
INVENTOR(S)       : Marcos Guilherme Schwarz Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

First Day of September, 2015

Michelle K. Lee
*Director of the United States Patent and Trademark Office*